(12) United States Patent
Rodricks

(10) Patent No.: US 6,888,144 B2
(45) Date of Patent: May 3, 2005

(54) METHOD TO REDUCE SCATTER RADIATION IN DIGITAL IMAGING SYSTEMS

(75) Inventor: Brian Rodricks, Newark, DE (US)

(73) Assignee: Direct Radiography Corp., Newark, DE (US)

( * ) Notice: Subject to any disclaimer, the term of this patent is extended or adjusted under 35 U.S.C. 154(b) by 0 days.

(21) Appl. No.: 10/196,005

(22) Filed: Jul. 16, 2002

(65) Prior Publication Data

US 2004/0011963 A1 Jan. 22, 2004

(51) Int. Cl.⁷ ................................................. G01T 1/24
(52) U.S. Cl. ................................... 250/370.09; 250/586
(58) Field of Search ........................... 250/370.09, 366, 250/484.4, 370.08

(56) References Cited

U.S. PATENT DOCUMENTS

| | | | |
|---|---|---|---|
| 4,071,767 A | 1/1978 | Pury et al. | |
| 4,099,063 A | 7/1978 | Pury et al. | |
| 4,105,920 A | 8/1978 | Pury et al. | |
| 4,340,818 A | 7/1982 | Barnes | |
| 5,070,248 A | 12/1991 | Pesce | |
| 5,241,578 A | 8/1993 | MacMahon | |
| 5,331,166 A * | 7/1994 | Crosetto et al. | 250/370.11 |
| 5,331,179 A | 7/1994 | Lee et al. | |
| 5,388,143 A | 2/1995 | MacMahon | |
| 5,475,230 A * | 12/1995 | Stumpf et al. | 250/484.4 |
| 5,574,768 A | 11/1996 | McLean | |
| 5,747,812 A * | 5/1998 | DiFilippo | 250/363.1 |
| 5,753,921 A * | 5/1998 | Trauernicht et al. | 250/370.09 |
| 5,777,335 A * | 7/1998 | Mochizuki et al. | 250/370.09 |
| 5,804,832 A | 9/1998 | Crowell et al. | |
| 6,178,224 B1 | 1/2001 | Polichar et al. | |
| 6,242,745 B1 * | 6/2001 | Berlad et al. | 250/370.1 |
| 6,269,176 B1 | 7/2001 | Barski et al. | |
| 6,455,857 B1 * | 9/2002 | Iwabuchi | 250/370.01 |
| 6,548,815 B1 * | 4/2003 | Umazaki | 250/370.09 |

FOREIGN PATENT DOCUMENTS

EP  874 273 A1  10/1998 ........... G03C/1/825

* cited by examiner

Primary Examiner—Albert Gagliardi
(74) Attorney, Agent, or Firm—Cooper & Dunham LLP

(57) ABSTRACT

X-ray image degradation due to scattered radiation is reduced in a system using a planar sensor sheet by providing an X-ray absorbing sheet in front of the sensor sheet, or in back of the sensor sheet, or both. The thickness and material of construction of each X-ray absorbing sheet depends on the X-ray absorptivity of the material used, and whether the absorbing sheet is in front or in back of the sensor sheet. The front absorbing sheet is preferably as close as possible to the sensor sheet. The back absorbing sheet, if used, can be at essentially any distance from the sensor sheet, beyond a certain minimum, consistent with practical space limitations in the overall physical shape and design of the unit.

18 Claims, 6 Drawing Sheets

PRIOR ART    FIG 4a

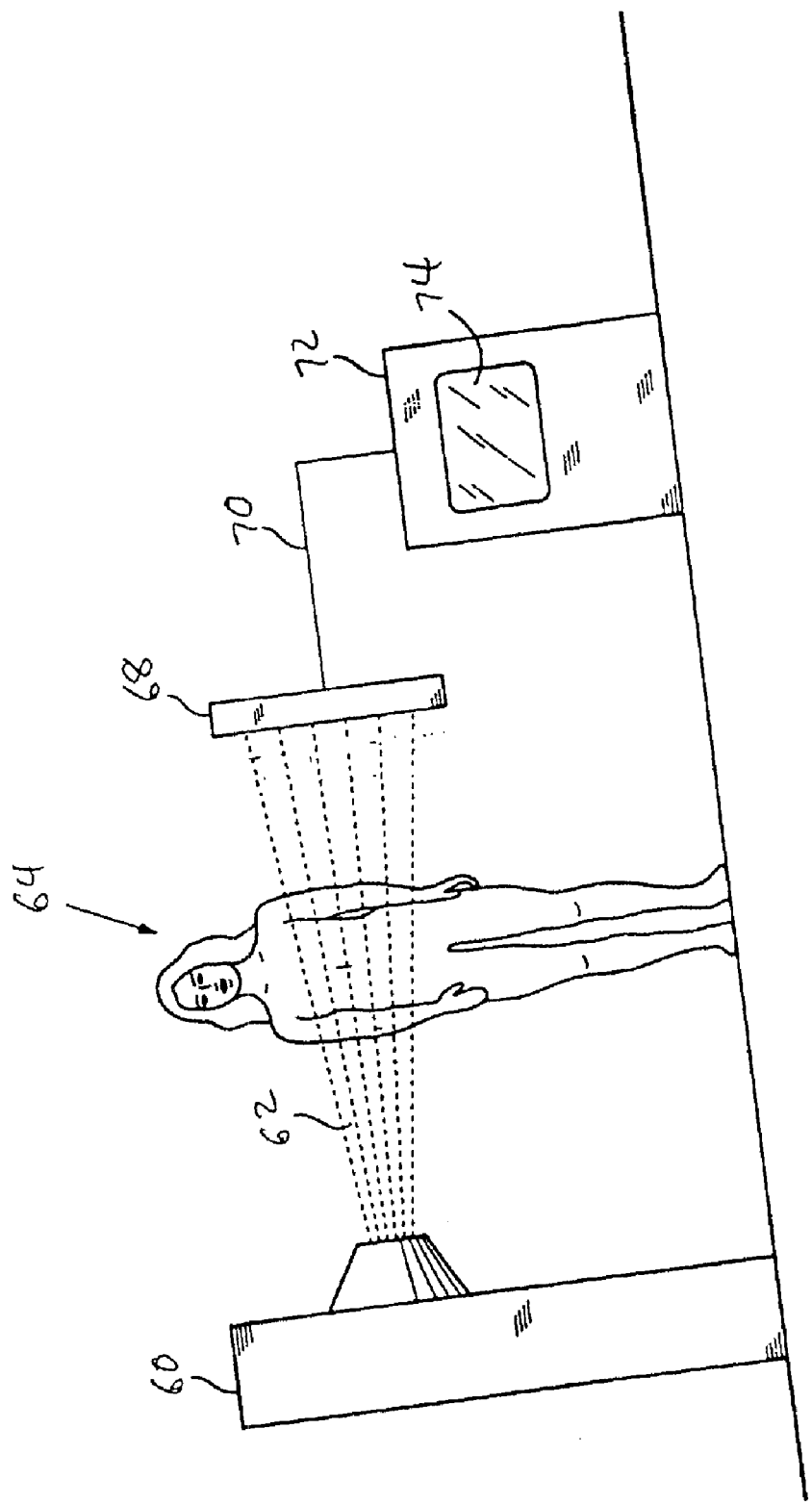

METHOD TO REDUCE SCATTER RADIATION IN DIGITAL IMAGING SYSTEMS

FIELD OF THE INVENTION

The invention relates to a device for reducing the amount of scattered radiation received by a radiation detection panel, a direct radiographic imaging system employing such a device, and a method for reducing image degradation due to scattered radiation.

BACKGROUND OF THE INVENTION

X-ray images are decreased in contrast by X-rays scattered from objects being imaged; this is referred to as "forward scatter". In an effort to overcome forward scatter, anti-scatter grids have long been used (Gustov Bucky, U.S. Pat. No. 1,164,987) to absorb the scattered X-rays while passing the primary X-rays, which produce the desired image. A problem with using grids, however, is that whenever the X-ray radiation detection panel resolution is comparable to or higher than the spacing of the grid, an image artifact from the grid may be seen. Bucky recognized this problem, which he addressed by moving the anti-scatter grid during exposure to eliminate grid image artifacts by blurring the image of the anti-scatter grid (but not of the object). Subsequent improvements to the construction of anti-scatter grids have reduced the need to move the grid, thereby simplifying the apparatus and timing between the anti-scatter grid motion and X-ray source. For all of these early systems, images were recorded on radiographic films using traditional silver halide technology.

More recently, digital radiographic imaging using radiation detection panels comprising a two-dimensional array of tiny sensors to capture a radiation-generated image have come into common use. The radiation is imagewise modulated as it passes through an object having varying radiation absorption areas. Information representing an image is typically captured as a charge distribution stored in a plurality of charge storage capacitors in individual sensors, arrayed in a two dimensional matrix, hereinafter referred to as a digital sensor array.

However, Moiré pattern artifacts can be introduced when image capture is accomplished through this means if an anti-scatter grid is used, or when film images are digitized. (The Essential Physics of Medical Imaging, Jerrold T Bushberg, J. Anthony Seibert, Edwin M. Leidholdt, Jr., and John M. Boone. ©1994 Williams & Wilkins, Baltimore, pg. 162 ff.). Thus when the X-ray radiation detection panel employs a digital sensor array, thereby generating a two dimensional array of picture elements, the beat between the spatial frequency of the sensors and that of the anti-scatter grid gives rise to an interference pattern having a low spatial frequency, i.e. a Moiré pattern.

Several approaches have been taken to attempt to solve this problem, all of them involving improvements in the design and/or motion of the grids. One described in U.S. Pat. No. 5,666,395 to Tsukamoto et al. teaches Moiré pattern prevention with a static linear grid having a grid pitch that is an integer fraction of the sensor pitch.

As noted above, the approach originally proposed by Bucky in U.S. Pat. No. 1,164,987, describes moving the anti-scatter grid during radiation exposure to blur the artifact images generated by the grid. This approach is limited by the fact that, in modern radiographic equipment, the exposure time is determined by automated exposure control devices. The total exposure time is therefore unknown, making it difficult to time the grid motion to cover the entire exposure period.

A third approach, designed to overcome the problem of not knowing the total exposure time required for a given imaging event, is described by Lee et al in U.S. Pat. No. 6,181,773, and involves the use of a grid driven with a variable speed profile.

Despite these advances however, X-ray imaging that requires high radiation doses due to thick samples or a need for better contrast detail suffers image quality degradation due to scatter radiation. Sometimes the scatter radiation is in fact greater than the contrast detail inherent in the image. Moreover, in the case of low contrast detail imaging where signal strength is increased to improve image quality, the use of an anti-scatter grid is usually not possible. In such systems, the combination of short wavelength X-ray and exposure times of several seconds make it difficult to use either a single-stroke or a multi-stroke grid.

In addition to the forward scatter generated by the object being imaged, "back scatter" resulting from X-rays impinging on components behind the image sensor sheet causes further image degradation. In U.S. Pat. No. 5,804,832, Crowell teaches the use of thin strips of lead to protect electronic components from damage by impinging radiation, but such strips are outside the image area (if in front of the sensor sheet) or cover only part of the image area (if behind the sensor sheet), such that only a portion of the back scatter is blocked. Thus there continues to be a need for practical means of reducing both forward and back scatter, particularly in low contrast detail imaging applications.

SUMMARY OF THE INVENTION

This need is addressed by the device of this invention, which in one aspect is a radiation detector comprising (a) a radiation detection panel, the panel comprising a radiation sensor sheet comprising a front surface and a back surface, said front surface being oriented toward a radiation source, and (b) at least one of:

a solid radiation absorbing front sheet over and substantially parallel to said front surface at a first distance equal to less than about a resolution limit of said sensor sheet, and having a first thickness of from about 10 $\mu$m to about 1 mm; and a solid radiation absorbing back sheet over and substantially parallel to said back surface at a second distance of from about 1 mm to about 100 mm, and having a second thickness of from about 1 $\mu$m to about 3 mm.

In another aspect, the invention is a method for reducing image degradation due to scattered radiation, the method comprising exposing to radiation a radiation detector comprising (a) a radiation detection panel, the panel comprising a radiation sensor sheet comprising a front surface and a back surface, said front surface being oriented toward a radiation source, and (b) at least one of:

a solid radiation absorbing front sheet over and substantially parallel to said front surface at a first distance equal to less than about a resolution limit of said sensor sheet, and having a first thickness of from about 10 $\mu$m to about 1 mm; and a solid radiation absorbing back sheet over and substantially parallel to said back surface at a second distance of from about 1 mm to about 100 mm, and having a second thickness of from about 1 $\mu$m to about 3 mm.

As used herein, the term "radiation absorbing" means substantially radiation absorbing, and does not imply 100% absorption.

BRIEF DESCRIPTION OF DRAWINGS

FIG. 4a shows a cross section of a prior art phosphor sensor sheet useful for a Computed Radiography application.

FIG. 6 shows in schematic representation a system for obtaining a radiogram of a target, comprising a radiation source, a radiation detection panel, and a control console, in accordance with this invention.

DETAILED DESCRIPTION OF THE INVENTION

The invention will next be illustrated with reference to the figures, wherein the same numbers indicate the same elements in all figures. Such figures are intended to be illustrative rather than limiting and are included herewith to facilitate the explanation of the apparatus of the present invention.

Figure 1:
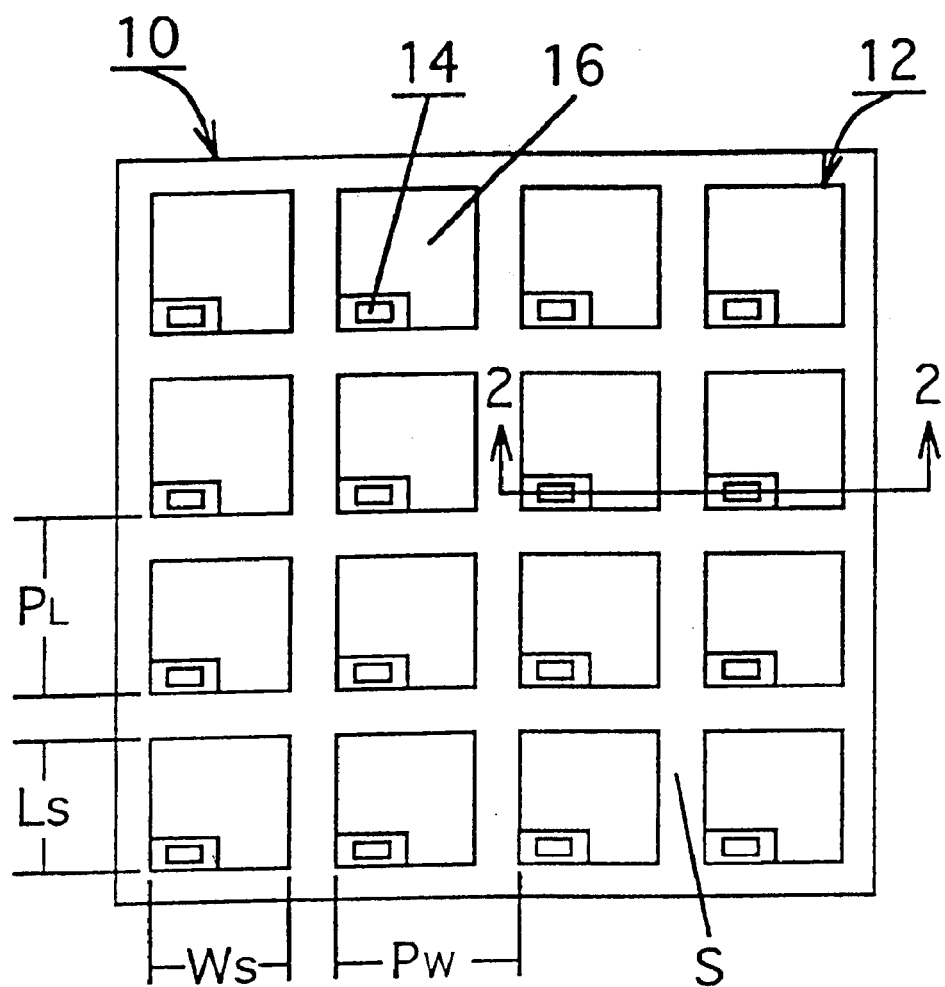
FIG. 1 shows a top view of a typical digital sensor array of the prior art.

Referring now to FIG. 1, there is shown a digital sensor array 10 useful for radiographic imaging applications. Array 10 comprises a plurality of sensors 12 arrayed in a regular pattern. Each sensor comprises a switching transistor 14 and a radiation detection electrode 16, which defines the sensor radiation detection area. Each radiation detection area has a width "$W_S$" and a length "$L_S$", and is separated from an adjacent radiation detection area by an interstitial space "S". The interstitial spaces are substantially incapable of detecting incident radiation. Associated with the sensors there is also a sensor pitch along the sensor length, "$P_L$" and a sensor pitch along the sensor width, "$P_W$". The resolution limit R of the sensor array is approximately equal to the larger of $P_L$ and $P_W$.

Figure 2:
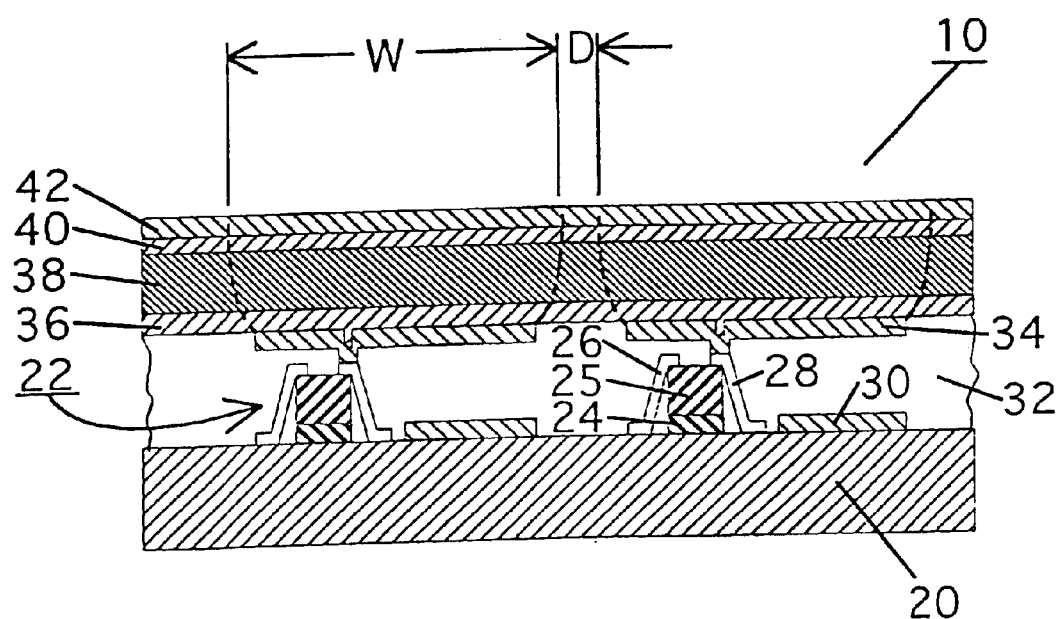
FIG. 2 shows a cross section of the digital sensor array of FIG. 1 along line 2—2, showing in schematic elevation a portion of such sensor array.

FIG. 2 shows a schematic section elevation of a portion of the digital sensor array 10 viewed along arrows 2—2 in FIG. 1. The sensor array used for illustrating this invention is of the type described in U.S. Pat. No. 5,319,206 issued to Lee et al. and assigned to the assignee of this application, and in Lee et al., U.S. Pat. No. 6,025,599, also assigned to the assignee of this application, both incorporated herein by reference.

Briefly a sensor of this type comprises a dielectric supporting base 20. On this base 20 there is constructed a switching transistor 22, usually a Field Effect Transistor (FET) employing thin film technology. The FET includes a semiconductor material 25, a gate 24, a source 26 and a drain 28. Adjacent the FET there is built a first electrode 30. A dielectric layer 32 is placed over the FET and the first electrode 30. A collector electrode 34 is placed over the first electrode 30 and the FET 22. Over the collector electrode there is placed a barrier or insulating layer 36 and over the insulating layer 36 a radiation detection layer 38, which is preferably a layer of amorphous selenium. A second dielectric layer 40 is deposited over the radiation detection layer, and a top electrode 42 is deposited over the top dielectric layer.

The barrier or insulating layer 36, the radiation detection layer 38, the second dielectric layer 40 and the top electrode layers are continuous layers extending over all the FETs and collector electrodes.

In operation, a static field is applied to the sensors by the application of a DC voltage between the top electrode and the first electrodes. Upon exposure to X-ray radiation, electrons and holes are created in the radiation detection layer and travel under the influence of the static field toward the top electrode and the collector electrodes. Each collector electrode collects charges from the area directly above it, as well as some fringe charges outside the direct electrode area. There is thus an effective radiation sensitive area "W" associated with this type of sensor which is somewhat larger that the physical area of the collector electrode. The sensitive areas are separated by a dead space D. In the case where the effective sensitive area is equal to the collector electrode area, D becomes the interstitial S space.

A typical sensor array also comprises a number of electronic address and control elements typically placed along the edge of the sensor array. Within the context of this invention, the sum total of the effective radiation sensitive areas "W" of the sensors is referred to as the "array active area", and the front surface of this array is referred to as the "active front surface".

Figure 3:
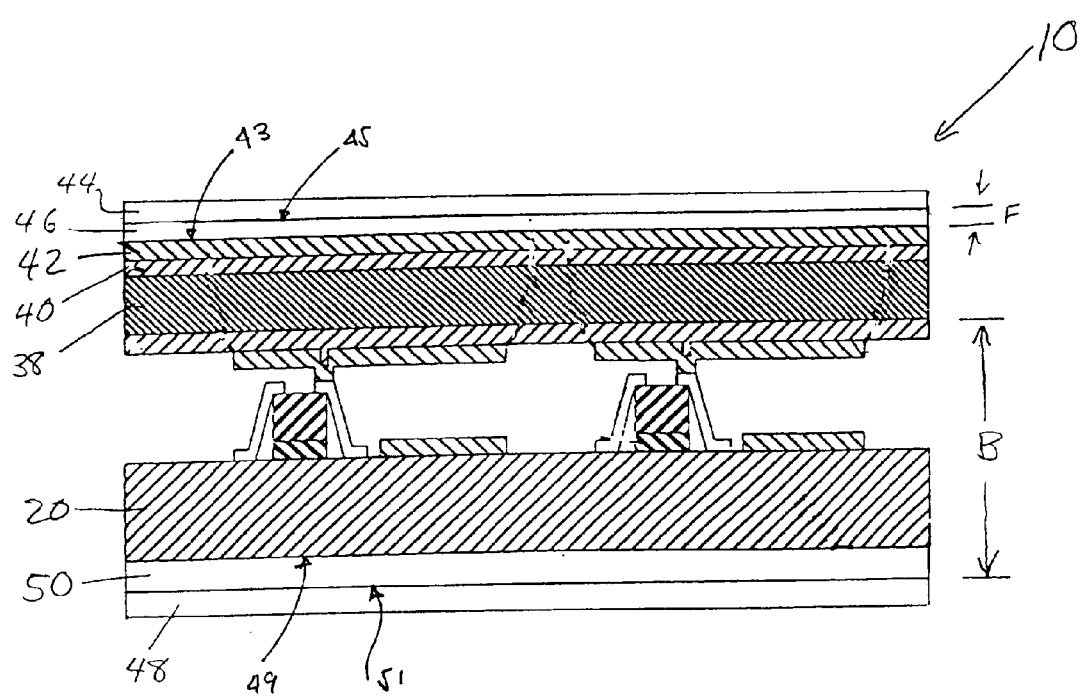
FIG. 3 shows the digital sensor array portion of FIG. 2 with front and back radiation absorbing sheets in place, in accordance with this invention.

FIG. 3 shows the same digital sensor array as in FIG. 2, with a radiation absorbing front sheet 44 and a radiation absorbing back sheet 48 in place, in accordance with one embodiment of this invention. The front sheet may be separated from top electrode 42 by a distance F, and the back sheet is separated from the nearer surface of radiation detection layer 38 by a distance B. Space 46 between the top surface 43 and the back surface 45 of font sheet 44, and space 50 between the back surface 49 of the dielectric base 20 and the front surface 51 of the back sheet 48, may optionally be filled with any convenient material that is not substantially absorptive of X-rays. Distance F is between about 0 µm and about the resolution limit R of the digital sensor array 10, and is preferably as close to 0 µm as possible. Distance B is from about 1 mm to about 100 mm, preferably about 2 mm.

FIG. 4a shows a prior art phosphor sensor sheet 55 useful for a Computed Radiography (CR) imaging system. The phosphor sensor sheet comprises a storage phosphor layer 52, which records X-ray images, on a support sheet 54. Imaging radiation striking the phosphor layer 52 is recorded there in the form of a latent image, which is subsequently read by scanning the phosphor with a laser (not shown) capable of stimulating photonic emissions from areas where X-rays had impinged during image formation. The pattern of these emissions is recorded to form an image, using an appropriate recording device (not shown).

Figure 4B:
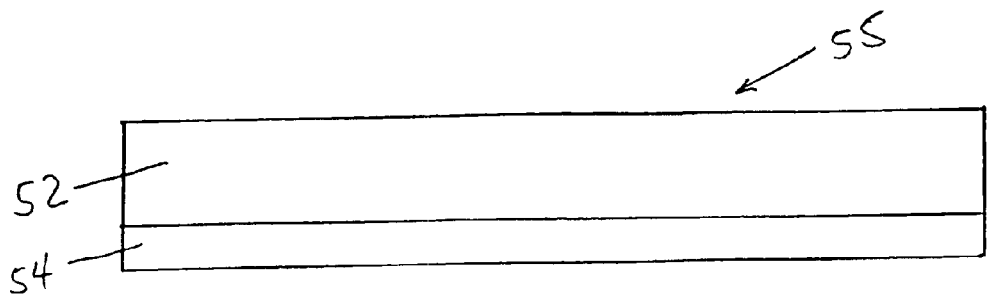
FIG. 4b shows the phosphor sensor sheet of FIG. 4a with front and back radiation absorbing sheets in place, in accordance with this invention.

FIG. 4b depicts the same Computed Radiography (CR) phosphor sensor sheet as in FIG. 4a, with a radiation absorbing front sheet 44' and radiation absorbing back sheet 48' in place, in accordance with another embodiment of this invention. The front sheet may be separated from the top surface 53 of storage phosphor layer 52 by a distance F', and the back sheet is separated from the nearer surface of storage phosphor layer 52 by a distance B'. Space 46' between the back surface 45' of front sheet 44', and space 50' between the back surface 49' of support sheet 54 and the front surface 51' of back sheet 48', may optionally be filled with any convenient material that is not substantially absorptive of X-rays. Distance F' is between about 0 µm and about the resolution limit R' of storage phosphor layer 52, and is preferably as close to 0 µm as possible. Distance B' is from about 1 mm to about 100 mm, preferably about 2 mm.

The radiation absorbing front sheet 44 or 44' is mounted in front of the sensor sheet and parallel to it. It is of substantially the same size and shape as the sensor sheet, such that essentially all of the sensor sheet is shielded, and is composed of a material that substantially absorbs scattered X-rays. The thickness of the sheet needed for best performance depends upon the inherent X-ray absorptivity of the material from which it is made, and upon the wavelength and dosage of the radiation used. Those skilled in the art will be well aware of how to adjust these parameters for optimal effect in any given application, but as a general rule, the sheet should not absorb more than about half of the non-scattered radiation (which produces the image) while absorbing the majority of the scattered radiation, which is of longer wavelength and therefore more easily absorbed.

Materials suitable for use in making the front sheet include ones that are easy to shape with uniform flatness, which do not fluoresce strongly upon exposure to scattered X-rays, but which do fluoresce upon exposure to primary X-rays, and that comprise elements having an atomic number of about 21 or higher. They include, but are not limited to, copper, steel, lead, tungsten, molybdenum, mixtures of any of these, and layered sheets comprising two or more of these. Lead is a preferred material. By fluorescence is meant absorption of an X-ray photon, followed by emission of a lower energy (longer wavelength) photon, typically also in the X-ray region of the spectrum. Such a re-emission of radiation, if resulting from absorption of a scattered (i.e. non-image) X-ray, could impinge on the sensor sheet and give an undesired signal. Therefore, absorption of as many scattered X-ray photons as possible, without fluorescence, is desirable.

On the other hand, fluorescence resulting from the absorption by the front sheet of primary (i.e. image) X-ray photons may, under the right conditions, enhance image contrast, for the following reason. X-ray absorption by radiation detection layer 38 or phosphor layer 52 is only partly efficient, due to the high energy of the primary photons which constitute the image. Lower energy X-ray photons would however be more efficiently captured by 38 or 52. Therefore, if a means is provided for converting primary X-ray photons to lower energy photons, while maintaining the original image pattern represented by the primary rays, a net stronger image signal may be detected. To avoid losing image information, the front sheet must be as close as possible to radiation detection layer 38 or phosphor layer 52, so that the photons resulting from fluorescence are produced as close as possible to the surface of 38 or 52 and therefore cannot spread out before reaching it, creating fuzziness in the image.

Mounting of 44 or 44' can be achieved by any convenient means, advantageously by attaching the front sheet to the sensor sheet, either directly or with an intervening layer of a substantially non X-ray absorbing material. A direct press fit without any intervening layer is preferred, as this results in more nearly approaching the preferred 0-µm distance from the sensor front surface.

The radiation absorbing back sheet 48 or 48' is mounted in back of the sensor sheet and parallel to it. It is of substantially the same size and shape as the sensor sheet, such that essentially all of the sensor sheet is shielded, and is also composed of a material that substantially absorbs scattered X-rays. Preferably, the material used for the back sheet exhibits less fluorescence when irradiated than does that used for the front sheet. The lower limit on the thickness of the sheet needed for best performance depends upon the inherent X-ray absorptivity of the material from which it is made, and upon the wavelength and dosage of the radiation used. Those skilled in the art will be well aware of how to adjust these parameters for optimal effect in any given application, but as a general rule, the sheet should absorb as much as possible of all incident X-radiation, whether scattered or non-scattered. There is no inherent upper limit on the thickness of the sheet; the upper limit will be determined by practical concerns regarding cost, space available, and similar issues.

In contrast with the positioning of the front sheet, the back sheet is kept at a distance much greater than the resolution limit R or R' of the sensor sheet. Since the structure of digital sensor array 10 or phosphor sensor sheet 55 makes it impossible to put the back sheet close enough to enhance contrast, it is removed to a distance at which any fluorescence emanating from it becomes smeared out, thus losing essentially all image information. This is better than if the sheet were at an intermediate distance and therefore produced half-formed images, which would tend to detract from overall image quality. Beyond this limitation, B or B' may represent essentially any distance, consistent with practical space limitations in the overall physical shape and design of the unit. As a matter of practicality, the distance will typically be from about 1 mm to about 100 mm, preferably about 2 mm.

Mounting of the back sheet can be achieved by any convenient means, advantageously by adhering the back sheet to the sensor sheet, either directly or with an intervening layer of a substantially non X-ray absorbing material. Direct adhesion is preferred.

In one embodiment of the invention, a front sheet made of lead having a thickness of 0.125 mm is mounted in direct contact with the front surface of a digital array such as shown in FIGS. 1, 2, and 3, and back sheet made of lead with a thickness of 0.5 mm is mounted 2 mm behind the supporting base 20 of digital sensor array 10 or 2 mm behind Computed Radiography phosphor sensor sheet 55. Such an arrangement gives significantly enhanced image quality compared to a radiation detection panel not so equipped.

Figure 5:
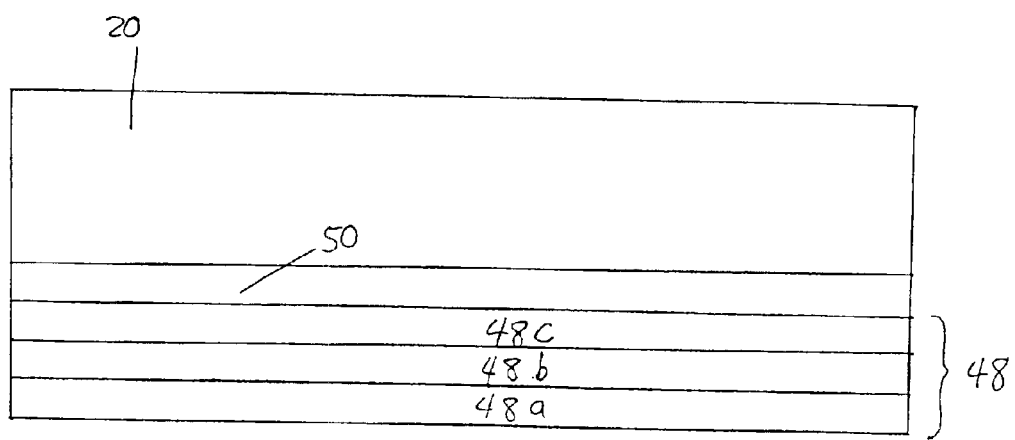
FIG. 5 shows a lower portion of the digital sensor array of FIG. 3, with a layered back radiation-absorbing sheet in place, in accordance with this invention.

FIG. 5 shows another embodiment of the invention, in which the back sheet comprises two or more layers, each of a different material, with atomic number increasing with distance from the sensor sheet, in this case a digital sensor array. For example, back sheet 48 may comprise a lead layer 48a of thickness 0.5 mm, a copper layer 48b of thickness 0.5 mm on top of the lead layer, and a layer of aluminum 48c of thickness 0.5 mm on top of the copper layer. The back sheet is mounted behind base 20. Similarly, a layered back sheet can be used in back of a storage phosphor layer, in place of sheet 48' in FIG. 4b. In both cases, fluorescence resulting from X-rays impinging on the back-most layer is absorbed by the material between it and the sensor sheet, and significantly enhanced image quality is obtained. Although 3 layers and specific materials and dimensions are given here, the invention is not limited thereby.

FIG. 6 illustrates the use of this invention in a system to obtain a radiogram. The system includes a radiation source 60, which is typically an X-ray source emitting a beam of radiation 62. A target or patient 64 is placed in the beam path. On the other side of the patient there is placed a radiation detection panel 68 comprising the device of FIG. 3. The panel is connected over wire 70 to a control console 72, which may include a display screen 74 and/or a hard copy output device (not shown) for producing a hard copy of the radiogram. Typically the control console will also include a plurality of image processing circuits, all of which are well known in the art. Preferably some form of gain correction methodology is also employed, an example of which is disclosed by Rodricks in U.S. Pat. No. 6,350,985 B1, incorporated herein by reference.

Figure 4B:
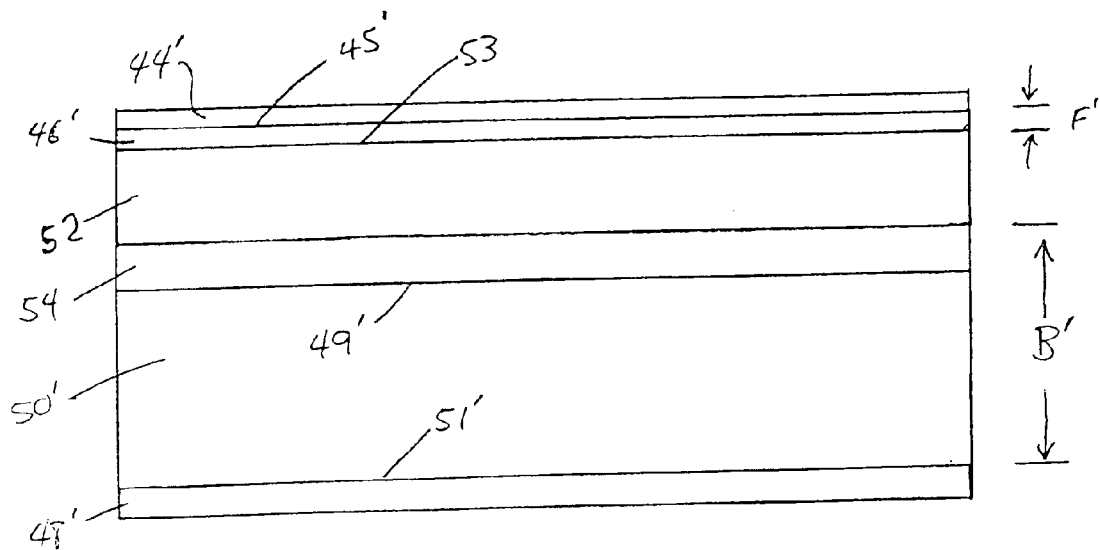

Alternatively, in the case where panel 68 comprises the device of FIG. 4, i.e. for a Computed Radiography system, wire 70 is absent. Instead, imagewise X-ray exposure results in a latent image on Computed Radiography phosphor sensor sheet 55, which is then fed into and read by console 72 and displayed on display screen 74. It will be appreciated that the configurations of 72 and 74 will be different for use in the context of a CR system than those used in conjunction with the digital sensor array of FIG. 3.

The subject 64 may be a human or animal, or may be an inanimate object. As an example, non-destructive testing of objects such as turbine blades, engine parts, aircraft wings, and structural members in a variety of industrial uses may be performed with the aid of this invention to look for cracks or other flaws in the object which might lead to mechanical failure.

Having described the invention, we now claim the following and their equivalents.

What is claimed is:

1. A radiation detector comprising
   a radiation detection panel, the panel comprising a radiation sensor sheet comprising a front surface and a back surface, said front surface being oriented toward a radiation sources; and
   a solid radiation absorbing front sheet over and substantially parallel to said front surface at a first distance equal to or less than a resolution limit of said sensor sheet, and having a first thickness of from about 10 $\mu$m to about 1 mm,
   wherein said solid radiation absorbing front sheet is a single sheet of a material that fluoresces upon exposure to primary radiation and does not substantially fluoresce upon exposure to scattered radiation, and said single sheet is in direct contact with said front surface of said sensor sheet.

2. The detector according to claim 1, further comprising a solid radiation absorbing back sheet under and substantially parallel to said back surface at a second distance greater than a resolution limit of said sensor sheet, and having a second thickness of from about 1 $\mu$m to about 3 mm.

3. The detector according to claim 2 wherein both said front and said back sheets are substantially coextensive with said front and said back surfaces.

4. The detector of claim 2 wherein said solid radiation absorbing back sheet comprises a lead sheet having a thickness of about 0.25 mm to about 2 mm.

5. The detector of claim 2 wherein said solid radiation absorbing back sheet comprises two layers.

6. The detector according to claim 2 wherein said front sheet is substantially coextensive with said front surface.

7. The detector according to claim 1, wherein the panel comprises an active front surface, and said front sheet is substantially coextensive with said active front surface.

8. The detector of claim 1 wherein said solid radiation absorbing front sheet comprises a lead sheet having a thickness of about 50 $\mu$m to about 200 $\mu$m.

9. The detector of claim 1 wherein said sensor sheet comprises a sheet comprising a storage phosphor.

10. The detector of claim 1 wherein said sensor sheet comprises a digital sensor array.

11. A method for reducing image degradation due to scattered radiation, the method comprising exposing to radiation a radiation detector comprising
    a radiation detection panel, the panel comprising a radiation sensor sheet comprising a front surface and a back surface, said front surface being oriented toward a radiation source; and
    a solid radiation absorbing front sheet over and substantially parallel to said front surface at a first distance equal to or less than a resolution limit of said sensor sheet, and having a first thickness of from about 10 $\mu$m to about 1 mm,
    wherein said solid radiation absorbing front sheet is a single sheet of a material that fluoresces upon exposure to primary radiation and does not substantially fluoresce upon exposure to scattered radiation, and said single sheet is in direct contact with said front surface of said sensor sheet.

12. The method of claim 11, wherein said radiation detector further comprises a solid radiation absorbing back sheet under and substantially parallel to said back surface at a second distance greater than a resolution limit of said sensor sheet, and having a second thickness of from about 1 $\mu$m to about 3 mm.

13. The method of claim 12 wherein said solid radiation absorbing back sheet comprises a lead sheet having a thickness of about 0.25 mm to about 2 mm.

14. The method of claim 11 wherein said solid radiation absorbing front sheet comprises a lead sheet having a thickness of about 50 $\mu$m to about 200 $\mu$m.

15. The method of claim 11 wherein said sensor sheet comprises a sheet comprising a storage phosphor.

16. The method of claim 11 wherein said sensor sheet comprises a digital sensor array.

17. A radiation detector comprising:
    a radiation detection panel, the panel comprising a radiation sensor sheet comprising a front surface and a back surface, said front surface being oriented toward a radiation source;
    a solid radiation absorbing front sheet over and substantially parallel to said front surface at a first distance equal to or less than about a resolution limit of said sensor sheet, and having a first thickness of from about 10 $\mu$m to about 1 mm; and
    a solid radiation absorbing back sheet under and substantially parallel to said back surface at a second distance greater than a resolution limit of said sensor sheet, and having a second thickness of from about 1 $\mu$m to about 3 mm, wherein said second distance is about 2 mm,
    wherein said solid radiation absorbing front sheet is a single sheet of a material that fluoresces upon exposure to primary radiation and does not substantially fluoresce upon exposure to scattered radiation, and said single sheet is in direct contact with said front surface of said sensor sheet,
    wherein said solid radiation absorbing back sheet comprises a lead sheet having a thickness of about 0.25 mm to about 2 mm, and
    wherein said sensor sheet comprises a sheet comprising a storage phosphor.

18. A radiation detector comprising:
    a radiation detection panel, the panel comprising a radiation sensor sheet comprising a front surface and a back surface, said front surface being oriented toward a radiation source;

a solid radiation absorbing front sheet over and substantially parallel to said front surface at a first distance equal to or less than about a resolution limit of said sensor sheet, and having a first thickness of from about 10 μm to about 1 mm; and a solid radiation absorbing back sheet under and substantially parallel to said back surface at a second distance greater than a resolution limit of said sensor sheet, and having a second thickness of from about 1 μm to about 3 mm, wherein said second fixed distance is about 2 mm, wherein said solid radiation absorbing front sheet is a single sheet of a material that fluoresces upon exposure to primary radiation and does not substantially fluoresce upon exposure to scattered radiation, and said single sheet is in direct contact with said front surface of said sensor sheet, wherein said solid radiation absorbing back sheet comprises a lead sheet having a thickness of about 0.25 mm to about 2 mm, and wherein said sensor sheet comprises a digital sensor array.

* * * * *